United States Patent [19]

Maruyama et al.

[11] Patent Number: 4,977,232
[45] Date of Patent: Dec. 11, 1990

[54] AROMATIC POLYAMIDE FROM 2,2'-BIS(4-(4-AMINO-PHENOXY)PHENYL)-HEXAFLUORO PROPANE

[75] Inventors: Yutaka Maruyama; Haruhiko Komoriya, both of Kamifukuoka City, Japan

[73] Assignee: Central Glass Company, Limited, Ube, Japan

[21] Appl. No.: 227,532

[22] Filed: Aug. 3, 1988

[30] Foreign Application Priority Data

Aug. 4, 1987 [JP] Japan .................................. 62-193670

[51] Int. Cl.$^5$ ............................................. C08G 69/32
[52] U.S. Cl. ..................................... 528/185; 528/125; 528/128; 528/183; 528/190; 528/191; 528/229; 528/337; 528/348
[58] Field of Search ............... 528/185, 183, 190, 191, 528/348, 229, 337, 125, 128

[56] References Cited

U.S. PATENT DOCUMENTS

4,203,922   5/1980   Jones et al. .......................... 528/185
4,820,793   4/1989   Imai et al. ............................ 528/183

FOREIGN PATENT DOCUMENTS

0052348   3/1983   Japan ................................... 528/185
2144135   6/1987   Japan ................................... 528/185
2144140   6/1987   Japan ................................... 528/185

*Primary Examiner*—Harold D. Anderson
*Attorney, Agent, or Firm*—Fleit, Jacobson, Cohn, Price, Holman & Stern

[57] ABSTRACT

Novel aromatic polyamides high in heat resistance and soluble in various organic solvents are obtained each by reacting 2,2'-bis[4-(4-aminophenoxy)phenyl]-hexafluoropropane or a simple derivative thereof with an aromatic dicarboxylic acid, e.g. isophthalic acid, or its dihalide or diester.

2 Claims, No Drawings

AROMATIC POLYAMIDE FROM 2,2'-BIS(4-(4-AMINO-PHENOXY)PHENYL)HEXAFLUORO PROPANE

BACKGROUND OF THE INVENTION

This invention relates to a group of novel aromatic polyamides having 2,2'-bis[4-(4-aminophenoxy)phenyl]hexafluoropropane derivative units and a method of preparing same. The novel polyamides are excellent in heat resistance and soluble in various organic solvents.

Aromatic polyamide resins are generally excellent in mechanical characteristics such as tensile strength, elastic modulus and impact resistance, thermal characteristics such as heat distortion temperature and thermal decomposition temperature, dielectric characteristics, flame resistance and radiation resistance. In particular the aromatic polyamides disclosed in JP 35-13247 possess superior properties which have offered prospects for industrial applications. However, practical applications of these polyamides have been limited because of very poor solubilities in organic solvents.

Even though a polymer possesses attractive properties the polymer is of little value as an industrial plastic material unless it has good melt-processability and/or good solubility in a solvent low in price and convenient for industrial use. Considering high melting or softening temperatures of known aromatic polyamides, there is little expectation of aromatic polyamides very suitable for melt processing. Besides, solution coating processes cannot always be substituted by melt processing.

SUMMARY OF THE INVENTION

It is an object of the present invention to provide novel aromatic polyamides which are soluble in various organic solvents and possess excellent heat resistance and mechanical properties.

It is another object of the invention to provide a method of preparing aromatic polyamides of the invention.

We have accomplished the above objects by discovering that a group of aromatic polyamides high in solubilities in organic solvents can be formed by using 2,2'-bis[4-(4-aminophenoxy)phenyl]hexafluoropropane, or a simple derivative thereof, as the principal material.

More definitely, this invention provides aromatic polyamides having a structure represented by the general formula (1):

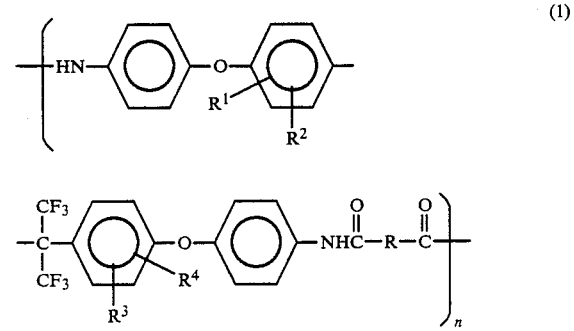

(1)

wherein $R^1$, $R^2$, $R^3$ and $R^4$ may be the same or different and each represents a hydrogen atom, an alkyl group having not more than 6 carbon atoms, an alkoxyl group having not more than 6 carbon atoms, chlorine atom, fluorine atom or bromine atom, R is a divalent aromatic group, and n is an integer from 1 to 200.

According to the invention an aromatic polyamide represented by the general formula (1) is prepared by reacting an aromatic diamine represented by the general formula (2) with a dicarboxylic acid represented by the general formula (3), a dicarboxylic acid dihalide represented by the general formula (4) or a dicarboxylic acid diester represented by the general formula (5):

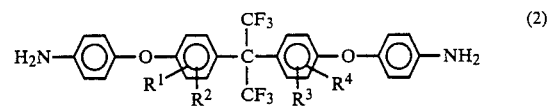

wherein $R^1$, $R^2$, $R^3$ and $R^4$ are as defined with respect to the general formula (1),

wherein R is the divalent aromatic group in the general formula (1),

wherein R is the divalent aromatic group in the general formula (1), and X is a halogen atom,

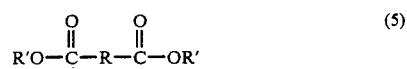

wherein R is the divalent aromatic group in the general formula (1), and R' is an alkyl group or a phenyl group.

Aromatic polyamides of the present invention are readily soluble in various and commonplace organic solvents and, therefore, can easily be formed into various shapes from solutions. Besides, these polyamides are excellent in heat resistance and have good mechanical properties. Accordingly these polyamides are of value as industrial plstic materials.

DETAILED DESCRIPTION OF THE INVENTION

In preparing an aromatic polyamide according to the invention from an aromatic diamine represented by the general formula (2), viz. 2,2'-bis[4-(4-aminophenoxy)phenyl]hexafluoropropane or a derivative thereof, by reaction with a dicarboxylic acid, any of many aromatic dicarboxylic acids represented by the general formula (3) can be employed. The following are examples of aromatic dicarboxylic acids suitable for use in the practice of the present invention: isophthalic acid, terephthalic acid, 4,4'-biphenyldicarboxylic acid, biphenylether-4,4'-dicarboxylic acid, benzophenone-4,4'-dicarboxylic acid, benzosulfone-4,4'-dicarboxylic acid, 2,6naphthalene-dicarboxylic acid, diphenylmethane-4,4'-dicarboxylic acid, 4,4'-isopropylidenediphenyl-1,1'-dicarboxylic acid and 4,4'-hexafluoroisopropylidenediphenyl-1,1'-dicarboxylic acid.

Alternatively it is possible, and is rather convenient, to use a dicarboxylic acid dihalide which may be any of many compounds represented by the general formula (4). Preferred examples are dichlorides of the above named ten kinds of dicarboxylic acids.

Still alternatively it is possible to use a dicarboxylic acid diester which may be any of many compounds represented by the general formula (5). Preferred examples are diphenyl esters of the above named ten kinds of dicarboxylic acids.

It is optional to use a combination of two or more kinds of dicarboxylic acids, dicarboxylic acid dihalides or dicarboxylic acid diesters to thereby obtain a copolymer as an aromatic polyamide according to the invention.

In the case of reacting the aromatic diamine with an aromatic dicarboxylic acid, the reaction is carried out in a suitable organic solvent such as, for example, N,N-dimethylformamide, N,N-dimethylacetamide or N-methyl-2-pyrrolidone at a temperature ranging from room temperature to the boiling point of the employed solvent. A similar organic solvent is used also when a dicarboxylic acid dihalide is used instead of the acid, but in this case a suitable range of the reaction temperature is from about −10° C. to about 50° C. A similar organic solvent is used also in the case of reacting the aromatic diamine with a carboxylic acid diester, and in this case it is suitable to carry out the reaction at a temperature in the range from about 50° C. to about 300° C. The invention is illustrated by the following nonlimitative examples.

Therefore, the obtained polymer was confirmed to be a polyamide having the structure represented by the following formula.

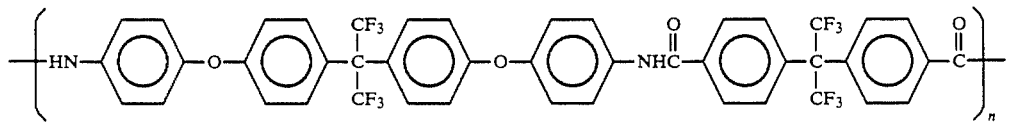

In sulfuric acid the intrinsic viscosity $\eta_{inh}$ of this polyamide was 1.02 dL/g at 30° C. The polyamide had a glass transition temperature, $T_g$, of 263° C. The polyamide dissolved in dimethylformamide to give a colorless and transparent solution, and a solid film of the polyamide was formed from this solution. By thermal analysis of the polyamide film, loss of weight indicative of thermal decomposition was imperceptible until the temperature neared 400° C. This is a clear evidence of excellent heat resistance of this polyamide. The polyamide was readily soluble in various popular organic solvents including methylethyl ketone, ethyl acetate, tetrahydrofuran, pyridine and dimethylformamide.

EXAMPLE 2

Another polyamide was prepared by reacting 1.296 g of APHOPH-HFP with 0.508 g of terephthalic acid dichloride in the same manner as in Example 1.

The obtained polyamide exhibited infrared absorptions at 1650 cm$^{-1}$ and 1600 cm$^{-1}$. Elementary analysis gave the following result.

Calculated (%): C 68.16, H 3.60, N 5.19. Found (%): C 68.00, H 3.65, N 5.21.

The structure of the polyamide was confirmed to be as represented by the following formula.

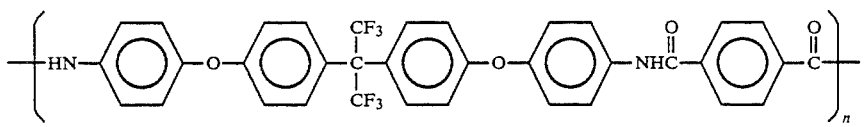

EXAMPLE 1

In a 50-ml three-necked flask having a nitrogen gas inlet, 1.296 g of 2,2′-bis[4-(4-aminophenoxy)phenyl]-hexafluoropropane (will be abbreviated to APHOPH-HFP) was dissolved in 5 ml of N,N-dimethylacetamide. The solution was frozen by using a bath of dry ice and acetone, and then 1.073 g of 4,4′-hexafluoroisopropylidenediphenyl-1,1′-dicarboxylic acid dichloride was put into the flask. After that the bath was changed to an ice bath, and gentle stirring was made to cause the frozen solution to gradually melt. The stirring was continued for 5 hr while maintaining a nitrogen gas atmosphere in the flask. As the result a polymer was obtained.

By infrared absorption spectrum analysis the polymer exhibited absorptions at 1650 cm$^{-1}$ and 1600 cm$^{-1}$ which are characteristic of acid amides. Elementary analysis of the polymer gave the following result.

Calculated (%): C 60.42, H 3.00, N 3.20. Found (%): C 60.02, H 3.02, N 3.13.

In sulfuric acid the intrinsic viscosity $\eta_{inh}$ of this polyamide was 1.33 dL/g at 30° C. $T_g$ of this polyamide was 250° C. The polyamide proved to be excellent in heat resistance since loss of weight indicative of thermal decomposition was imperceptible until the temperature neared 400° C. This polyamide was readily soluble in various organic solvents including dimethyl formamide, pyridine and dimethylsulfoxide.

EXAMPLE 3

The reaction of Example 2 was repeated except that terephthalic acid dichloride was replaced by the same quantity (0.508 g) of isophthalic acid dichloride.

The obtained polyamide exhibited infrared absorptions at 1650 cm$^{-1}$ and 1600 cm$^{-1}$, and the result of elementary analysis was as follows.

Calculated (%): C 68.16, H 3.60, N 5.19. Found (%): C 68.09, H 3.57, N 5.26.

The structure of this polyamide was confirmed to be as represented by the following formula.

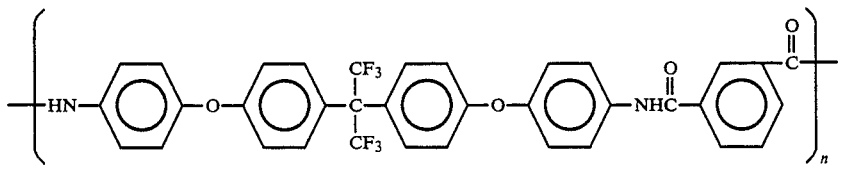

In sulfuric acid the intrinsic viscosity $\eta_{inh}$ of the polyamide was 1.30 dL/g at 30° C. $T_g$ of this polyamide was 240° C., and thermal analysis revealed good stability of the polyamide until the temperature neared 400° C. The polyamide was readily soluble in various organic solvents including dimethylformamide, pyridine and methylethyl ketone.

EXAMPLE 4

By the same method as in Example 1, 1.296 g of APHOPH-HFP was reacted with 0.6327 g of 2,6-naphthalene-dicarboxylic acid dichloride to form a polyamide.

The obtained polyamide exhibited infrared absorptions at 1650 cm$^{-1}$ and 1600 cm$^{-1}$, and the result of elementary analysis was as follows.

Calculated (%): C 66.86, H 3.74, N 4.00. Found (%): C 66.86, H 3.79, N 4.04.

The structure of the polyamide was confirmed to be as represented by the following formula.

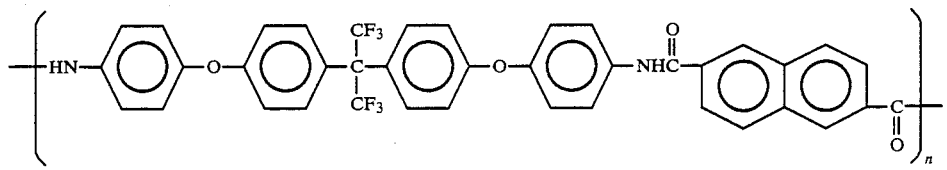

In sulfuric acid the intrinsic viscosity $\eta_{inh}$ of the polyamide was 1.11 dL/g at 30° C. $T_g$ of the poly-polyamide was 275° C., and the thermal analysis evidenced excellent heat resistance of the polyamide since loss of weight indicative of thermal decomposition was imperceptible until the temperature neared 400° C. This polyamide was readily soluble in various organic solvents including dimethylformamide, pyridine and dimethylsulfoxide.

What is claimed is:

1. An aromatic polyamide having a repeating unit structure represented by the formula (1):

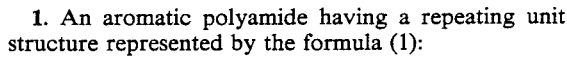

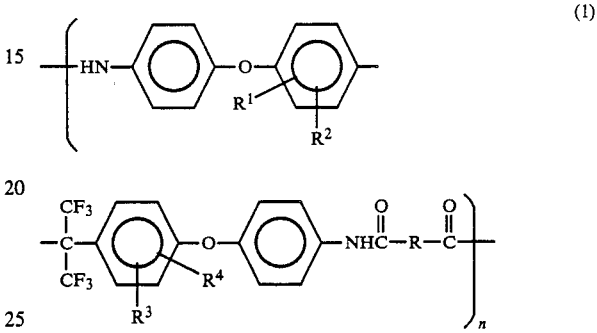

wherein R$^1$, R$^2$, R$^3$ and R$^4$ are the same or different and each represents a hydrogen atom, an alkyl group having not more than 6 carbon atoms, an alkoxyl group having not more than 6 carbon atoms, a chlorine atom, a fluorine atom or a bromine atom, R is

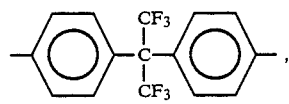

and n is an integer from 2 to 200.

2. An aromatic polyamide according to claim 1, wherein each of R$^1$, R$^2$, R$^3$ and R$^4$ is a hydrogen atom.

* * * * *